United States Patent
Cierniak

(10) Patent No.: US 11,055,332 B1
(45) Date of Patent: Jul. 6, 2021

(54) ADAPTIVE SORTING OF RESULTS

(71) Applicant: Google LLC, Mountain View, CA (US)

(72) Inventor: Michal Cierniak, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 795 days.

(21) Appl. No.: 15/609,796

(22) Filed: May 31, 2017

Related U.S. Application Data

(63) Continuation of application No. 12/900,901, filed on Oct. 8, 2010, now abandoned.

(51) Int. Cl.
    *G06F 16/00*     (2019.01)
    *G06F 16/338*     (2019.01)

(52) U.S. Cl.
    CPC .................... *G06F 16/338* (2019.01)

(58) Field of Classification Search
    CPC .. G06Q 50/01; G06Q 30/0201; G06F 16/951; G06F 16/9535; G06F 16/338
    See application file for complete search history.

(56) References Cited

U.S. PATENT DOCUMENTS

| | | | |
|---|---|---|---|
| 5,615,366 A | 3/1997 | Hansen | |
| 7,691,901 B2 | 4/2010 | Ka et al. | |
| 2005/0216454 A1 | 9/2005 | Diab et al. | |
| 2005/0234891 A1* | 10/2005 | Walther | G06F 16/9558 |
| 2005/0256866 A1 | 11/2005 | Le et al. | |
| 2006/0143158 A1* | 6/2006 | Ruhl | G06F 16/951 |
| 2006/0284744 A1 | 12/2006 | Shotland | |
| 2007/0078671 A1* | 4/2007 | Dave | G06Q 10/10 706/45 |
| 2007/0078845 A1* | 4/2007 | Scott | G06Q 30/0201 |
| 2007/0143694 A1 | 6/2007 | Rakowski et al. | |
| 2007/0233563 A1* | 10/2007 | Takahashi | G06Q 30/02 705/14.73 |
| 2008/0005064 A1* | 1/2008 | Sarukkai | G06F 16/957 |
| 2008/0097835 A1* | 4/2008 | Weiser | G06Q 30/02 705/306 |
| 2008/0195657 A1 | 8/2008 | Naaman et al. | |
| 2008/0201348 A1* | 8/2008 | Edmonds | G06Q 30/02 |
| 2009/0083096 A1* | 3/2009 | Cao | G06Q 30/02 705/7.32 |
| 2009/0192996 A1 | 7/2009 | Guo et al. | |
| 2009/0216608 A1* | 8/2009 | Bechtel | G06Q 10/10 705/7.32 |
| 2009/0222551 A1* | 9/2009 | Neely | G06F 16/951 709/224 |
| 2009/0248516 A1 | 10/2009 | Gross | |
| 2010/0070845 A1 | 3/2010 | Facemire et al. | |
| 2010/0114883 A1 | 5/2010 | Chea et al. | |
| 2011/0099192 A1 | 4/2011 | Ravikumar et al. | |

(Continued)

*Primary Examiner* — Shew Fen Lin
(74) *Attorney, Agent, or Firm* — Fish & Richardson P.C.

(57) ABSTRACT

Methods, systems, and apparatus, including computer programs encoded on a computer storage medium, for receiving a request, the request corresponding to a web page, identifying a plurality of annotation data sets associated with the web page in response to receiving the request, determining a popularity score associated with the resource, sorting the plurality of annotation data sets based on the popularity score to provide a sort order, and transmitting the plurality of annotation data sets over a network to display respective representations of the annotation data sets based on the sort order.

17 Claims, 9 Drawing Sheets

(56) References Cited

U.S. PATENT DOCUMENTS

2011/0145219 A1* 6/2011 Cierniak ............. G06F 16/9535
                                                        707/709
2011/0173191 A1* 7/2011 Tsaparas ................ G06Q 30/02
                                                        707/723
2012/0016678 A1   1/2012 Gruber et al.

* cited by examiner

ADAPTIVE SORTING OF RESULTS

BACKGROUND

This specification generally relates to displaying results, and more particularly to sorting of results for display.

SUMMARY

According to one innovative aspect of the subject matter described in this disclosure, a plurality of results are displayed based on an adaptive sort order of the results. By way of non-limiting example, results provided as annotations to a resource, such as a web page, can be sorted for display. The results can be adaptively sorted for display in a particular sort order based on a dynamic popularity, or "buzziness" of the particular resource associated therewith. For example, if the resource is determined to be popular, or "buzzy," the results are displayed in a first sort order. If the resource is not determined to be popular, or "buzzy," the results are displayed in a second sort order that is different from the first sort order. In some implementations, the first sort order is determined based on times, at which the results were generated (e.g., most recent result first). In some implementations, the second sort order is based on a quality of each of the results (e.g., highest quality result first). The popularity, or "buzziness" of a resource is dynamic in that it can change over time. For example, a resource may be popular at one point in time, and not popular at another point in time.

In general, another innovative aspect of the subject matter described in this disclosure may be embodied in methods that include the actions of receiving a request, the request corresponding to a web page, identifying a plurality of annotation data sets associated with the web page in response to receiving the request, determining a popularity score associated with the resource, sorting the plurality of annotation data sets based on the popularity score to provide a sort order, and transmitting the plurality of annotation data sets over a network to display respective representations of the annotation data sets based on the sort order.

These and other implementations may each optionally include one or more of the following features. For instance, sorting the plurality of data sets includes: comparing the popularity score to a threshold popularity score, setting the sort order to a first sort order when the popularity score is less than the threshold popularity score, and setting the sort order to a second sort order that is different than the first sort order when the popularity score is greater than or equal to the threshold popularity score; the first sort order is based on a plurality of quality scores, each quality score associated with an annotation data set of the plurality of annotation data sets; the quality score is determined based on at least one of a rating associated with the annotation data set, a length of content of the annotation data set, an author associated with content of the annotation data set, a language of content of the annotation data set, and a social graph corresponding to an author associated with content of the annotation data set; the second sort order is based on a plurality of timestamps, each timestamp associated with an annotation data set of the plurality of annotation data sets; transmitting instructions for displaying the representations in a first frame of a graphical user interface that is separate from a second frame within which the web page is displayed; a first sub-set of the plurality of annotation data sets includes posts corresponding to one or more social networks, and a second sub-set of the plurality of annotation data sets includes annotations generated based on the web page; the actions further include receiving a plurality of post data sets, each post data set corresponding to one or more social networks, determining that a sub-set of the plurality of post data sets correspond to the web page, and generating, for each post data set of the sub-set, an annotation data set; determining that a sub-set of the plurality of post data sets correspond to the web page includes: determining, for at least one post data set of the plurality of post data sets, a resource identification to which the at least one post data set corresponds, determining that the resource identification corresponds to the web page, and adding the at least one post data set to the sub-set; determining that a sub-set of the plurality of post data sets correspond to the resource further includes recognizing that the resource identification includes a shortened resource identification that links to a full-length resource identification, determining the full-length resource identification based on the shortened resource identification, and providing the full-length resource identification as data in the corresponding post data set; each annotation data set of the plurality of annotation data sets includes one or more of content, data identifying an author of the content, a rating associated with the annotation data set, a timestamp, and geo-coding data; determining a popularity score comprises receiving the popularity score from an external source; determining the popularity score includes: receiving data corresponding to a number of requests for the web page, and calculating the popularity score based on the number of requests; determining the popularity score includes: receiving data corresponding to a number of references to the web page, and calculating the popularity score based on the number of references; determining the popularity score includes: calculating a first popularity score, and calculating a second popularity score, wherein the popularity score is determined based on a combination of the first popularity score and the second popularity score; determining the popularity score further includes calculating the combination based on at least one weight applied to at least one of the first popularity score and the second popularity score; the request includes a request for the web page; and the request includes a request for the representations to be displayed.

Other implementations of this aspect include corresponding systems, apparatus, and computer programs, configured to perform the actions of the methods, encoded on computer storage devices.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to retrieving and displaying a plurality of results on a display, and to adaptive sorting of the results for display. By way of non-limiting example, the present disclosure provides annotations to a resource, such as a web page, as example results that can be sorted for display. As discussed in further detail herein, the results can be sorted for display based on a popularity, or "buzziness" of a particular resource associated therewith. For example, if the resource is determined to be popular, or "buzzy," the results are displayed in a first sort order. If the resource is not determined to be popular, or "buzzy," the results are displayed in a second sort order that is different from the first sort order. In some implementations, the first sort order is determined based on times, at which the results were generated (e.g., most recent result first). In some implementations, the second sort order is based on a quality of each of the results (e.g., highest quality result first).

Figure 1:
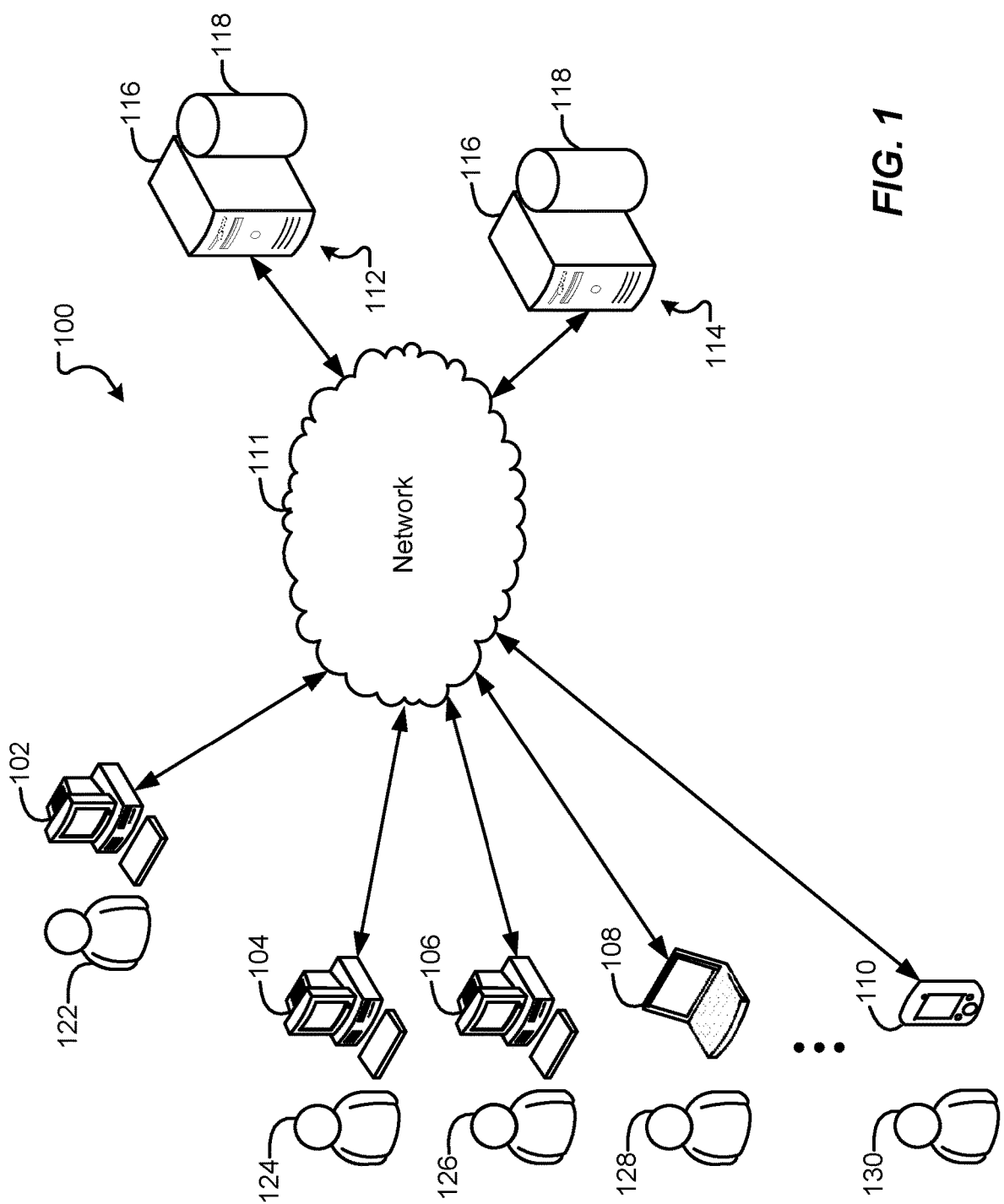
FIG. 1 is a diagram of an example network architecture.

FIG. 1 is a diagram of an example network architecture 100. The network architecture 100 includes computing devices 102, 104, 106, 108, 110 that can each communicate with a first server system 112 and/or a second server system 114 over a network 111. Each of the computing devices 102, 104, 106, 108, 110 includes an associated user 122, 124, 126, 128, 130, respectively. The network 111 can include a large computer network, such as a local area network (LAN), wide area network (WAN), the Internet, a cellular network, or a combination thereof connecting any number of mobile computing devices, fixed computing devices, and server systems. Each of the first and second server systems 112, 114 includes a computing device 116 and a machine-readable repository, or database 118.

The computing devices 102-110 enable the respective users 122-130 to access and view documents such as web pages of web sites. For example, the user 122 of computing device 102 can view a web page using a browser. The web page can be provided to the computing device(s) 102-110 by the server system 112, the server system 114 or another server system (not shown). As discussed in further detail below, the computing devices 102-110 also enable the respective users 122-130 to annotate displayed documents and/or to publish posts to social networking websites. In the example architecture 100, the computing devices 102, 104, 106 are illustrated as desktop-type computing devices, the computing device 108 is illustrated as a laptop-type computing device 108 and the computing device 110 is illustrated as a mobile computing device. It is appreciated, however, that the computing devices 102-110 can each include any type of computing device such as a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices.

Figure 2A:
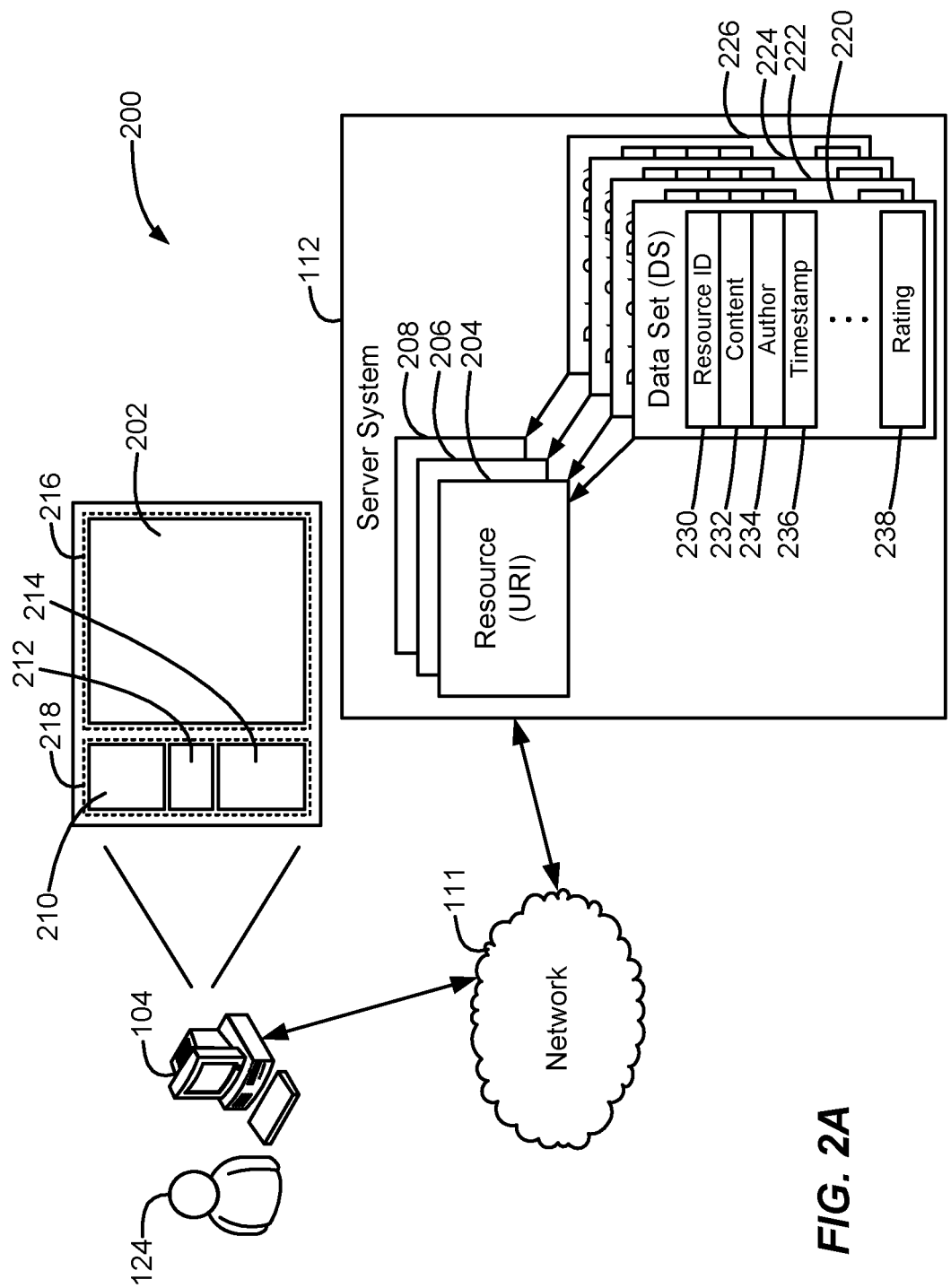
FIG. 2A is a diagram of a portion of the example network architecture of FIG. 1.

FIG. 2A is a diagram of a portion 200 of the example network architecture 100 of FIG. 1. In FIG. 2A, the computing device 104 communicates with the server system 112 to display a web page 202 of a website. Specifically, the server system 112 stores a plurality of resources 204, 206, 208, each having an associated resource identifier (Resource ID). By way of non-limiting example, and for purposes of illustration, the resource 204, 206, 208 can each correspond to different web pages of the same website, or can correspond to web pages of different web sites.

To view a web page, the user 124 can input or select a Resource ID using a browser that is executed on the computing device 104. The Resource ID can include, for example, a uniform resource indicator (URI) such as a uniform resource locator (URL). A request including the Resource ID is transmitted from the computing device 104 to the server system 112 over the network 111. In response, the server system identifies the requested resource based on the Resource ID, and transmits the resource to the computing device 104 over the network 111.

The browser executed on the computing device 104 can include a browser extension that enables a plurality of results to be displayed to a user (e.g., the user 124). In the present example, the results are provided as annotations 210, 212, 214 to the web page 202. An example browser extension includes Sidewiki provided by Google, Inc. The browser extension enables users (e.g., users 122-130 of FIG. 1) to make and view comments, or annotations about a displayed web page. In some implementations, the browser displays the web page in a first frame 216, and displays any associated annotations in a separate, second frame 218. The annotations include user generated content that provides, for example, feedback, information and/or discussion regarding the content of the corresponding web page. As discussed in further detail herein, the order in which the annotations are displayed can be determined based on a popularity of the web page.

With continued reference to FIG. 2A, annotation data sets 220, 222, 224, 226 are generated based on user input and are stored in the server system 112. Each annotation data set 220-226 corresponds to a resource 204-208. For example, the annotation data sets 220, 222 correspond to resource 204, the annotation data set 224 corresponds to the resource 206 and the annotation data set 226 corresponds to the resource 208. In some implementations, each annotation data set 220-226 includes resource identification data 230 (e.g., URI), content data 232, author data 234 and a timestamp data 236. For example, the resource identification data 230 indicates to which resource (e.g., resource 204, 206 or 208) the data corresponds, the content data 232 is the content input by an author, the author data 234 identifies the author of the content and the timestamp data 236 indicates the date and time that the content was submitted by the author. In some implementations, the data of each annotation data set further includes rating data 238 and/or other data. The rating data 238 can include a rating associated with the author of the content and/or a rating associated with the content itself. For example, users that view an annotation submitted by an author, as discussed in further detail herein, can submit an author rating corresponding to the user's perceived quality of the author, and/or can submit a content rating corresponding to the user's perceived quality of the annotation. Aggregate ratings (e.g., an average rating) can be maintained for each of the author rating and the content rating, and/or a combined rating can be maintained. In some implementations, a rating can be based on a number of "followers" a particular author has. In some implementations, a rating can be based on a length of the content of the annotation. For example, an annotation with longer content may be perceived as more informative and, thus have a higher rating than an annotation with shorter content.

The other data can include a number of annotations submitted by the particular author and/or details regarding a social network of the author (e.g., the number of followers the author has in a particular social network). In some implementations, the other data includes geo-coding data (e.g., a location associated with the author when the content was input).

An annotation data set is generated when a user, acting as an author, submits a comment, or annotation, regarding a particular resource. For example, the user 124 can submit a comment regarding web page 202 using computing device 104. Specifically, the browser can display an "Add Comment" button (e.g., in second frame 218) that can be selected by the user 124. In response to the user 124 selecting the "Add Comment" button, a dialogue box is displayed, through which the user 124 can input a comment regarding the co-displayed web page 202. Upon completing input of the content the user can select a "Submit" button displayed in the dialogue box. A data set (e.g., data set 220-226) is generated in response to the user 124 selecting the "Submit" button. The generated annotation data set include the Resource ID (e.g., URI) corresponding to the web page 202, the content input by the user 124, identifies the user 124 as the author of the content (i.e., in the author data 234), as well as the time and date that the content was submitted by the user 124 (i.e., in the timestamp data 236).

When the user 122 or another user (e.g., one or more of users 124-130) subsequently views the web page 202, the annotation submitted by the user 124 will be displayed, as well as annotations submitted by other users. Specifically, upon the user requesting a resource (e.g., a web page) and indicating a desire to see annotations associated with the resource, the server system (e.g., server system 112) identifies all annotation data sets that are associated with the particular resource, and these results are transmitted for display. This can be achieved, for example, by the server system retrieving all annotation data sets that include a Resource ID corresponding to the particular resource. The server system sorts the annotation data sets, as discussed in further detail herein, and provides the annotation data sets for displaying the annotations to the requesting user. The annotations are displayed based on a sort order of the underlying data sets.

In the example of FIG. 2A, the resources 204-206 and the corresponding data sets 220-226 are illustrated as residing in and accessible from the same server system (i.e., the server system 112). In implementations of the present disclosure, the resources 204-206 and the data sets 220-226 can reside in and be accessed from different server systems. For example, the server system 112 can generate and store the annotation data sets 220-226, while another server system (not shown) stores the resources 204-208. One or more of the resources 204-208 can be requested for display at a computing device (e.g., the computing device 104) and are provided to the computing device from the server system, on which they are stored. Annotations corresponding to the displayed resource(s) can be requested for display at the computing device (e.g., the computing device 104) and are provided to the computing device from the server system 112, on which they are stored. For example, an annotation request can be submitted to the server system 112 by the computing device 104, the annotation request including a resource ID (e.g., URI) for which annotations are to be displayed. The server system 112 can retrieve and serve all annotation data sets that include the resource ID.

Figure 2B:
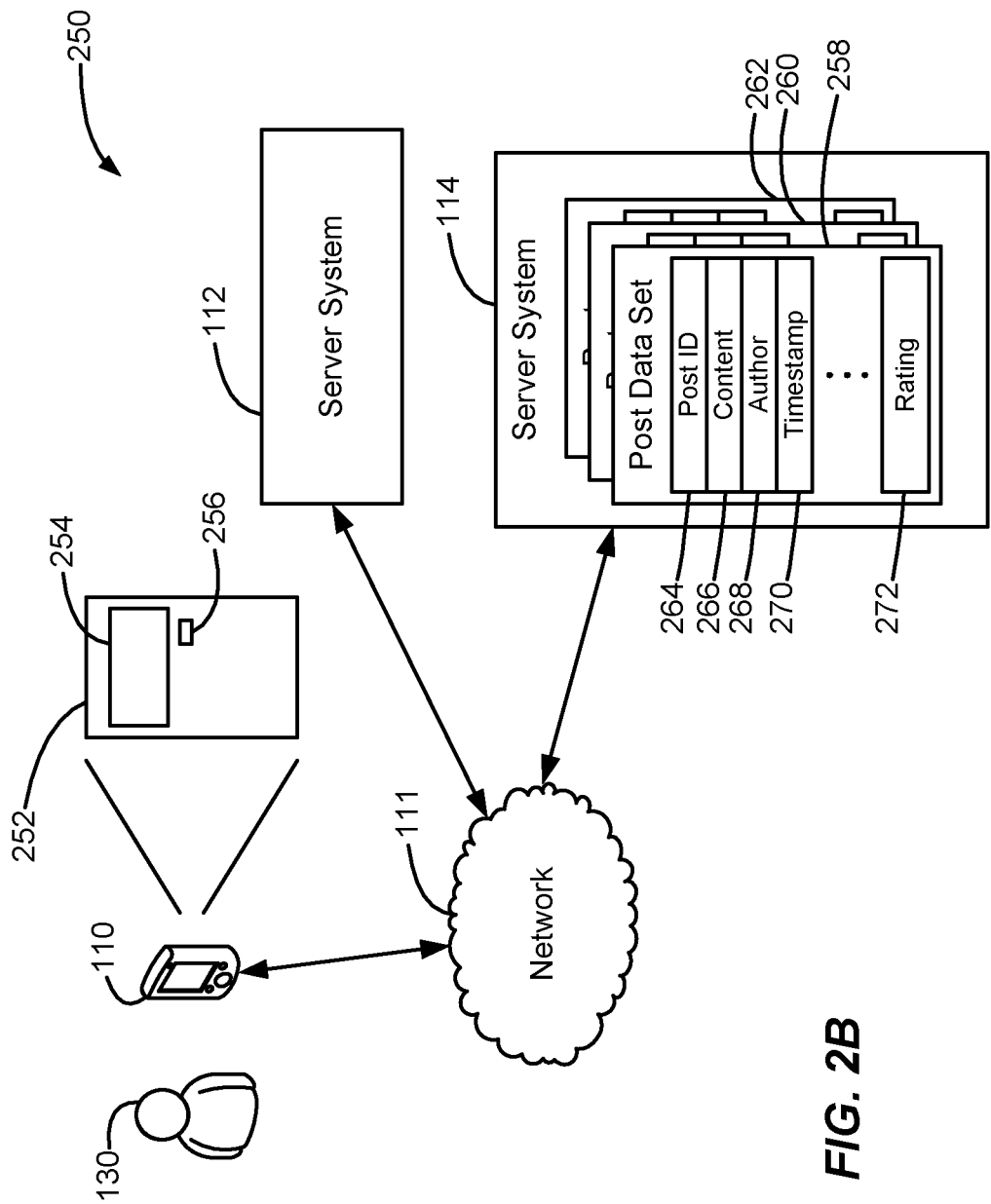
FIG. 2B is a diagram of another portion of the example network architecture of FIG. 1.

FIG. 2B is a diagram of another portion 250 of the example network architecture of FIG. 1. In FIG. 2B, the computing device 110 communicates with the server system 114 to display a social networking portal 250 on the computing device. Specifically, the server system 114 is associated with a social networking service that enables users of the social networking service to post comments regarding various topics. For example, the user 130 can input text into a dialogue box 254 displayed in the portal 252 and can submit the text to the server system 114 by selecting a "Submit" button 256. The server system 114 receives the text and generates a corresponding post data set. The post data set can be distributed to other users of the social networking service, and a corresponding post can be displayed to such other users. In some implementations, users of the social networking service can opt-in to or opt-out of instances or manners in which their posts may be further distributed, and/or whether, if a post is further distributed, the user remains anonymous.

The server system 114 stores post data sets 258, 260, 262, each having an associated post identifier (Post ID). The posts 258, 260, 262 can each correspond to different authors or the same author (e.g., one or more of the users 124-130). In some implementations, each post data set 258-262 includes post identification data 264 (e.g., Post ID), content data 266, author data 268 and timestamp data 270. For example, the post identification data 264 is a unique number assigned to the post data set, the content data 266 is the content (i.e., post text) input by an author, the author data 268 identifies the author of the content, and the timestamp data 270 indicates the date and time that the post was submitted by the author. In some implementations, the data of each data set further includes rating data 272 and/or other data. The rating data 272 can include a rating associated with the author of the post and/or a rating associated with the post itself. For example, users that view a post submitted by an author can submit an author rating corresponding to the user's perceived quality of the author, and/or can submit a post rating corresponding to the user's perceived quality of the post. Aggregate ratings (e.g., an average rating) can be maintained for each of the author rating and the post rating. In some implementations, the rating of a particular author can be determined based on a number of "followers" the author has.

The other data can include a number of posts submitted by the particular author and/or details regarding a social network of the author (e.g., the number of followers the author has in a particular social network). In some implementations, the other data can include geo-coding data (e.g., a location associated with the author when the content was input) and/or whether the post submitted by the author is a re-post of an earlier post submitted by a different author.

With continued reference to FIG. 2B, the post data sets can be provided from the server system 114 to the server system 112 over the network 111. The server system 112 can process the post data sets to generate corresponding annotation data sets for annotating a resource. In this manner, and as discussed in further detail herein, posts submitted through a social networking service can be provided as annotations to a resource.

The server system 112 can process the post data sets in various manners to generate corresponding annotation data sets. For example, the server system 112 can review the content data 266 of each post data set to determine whether a resource identifier (e.g., URI) is present in the content data. If the content data 266 includes a resource identifier, an annotation data set can be generated based on the particular post data set. As an illustration, an author may generate a post urging her social networking contacts to "Check out www.website.com, this site has great shopping deals!" When the server system 112 reviews the post data set corresponding to this example post, the server system 112 recognizes the URL "www.website.com" in the content data. Consequently, the server system 112 generates an annotation data set based on the corresponding post data set, whereby the URL is provided in the resource identification data 230 of the annotation data set, as discussed in further detail below.

As another example, the content data of a post data set can include a shortened resource identifier (e.g., a shortened URL). For example, a URL shortening service may have been used by the post author to generate a shortened URL that points to resource identifier of a particular resource. If the content data 266 includes a shortened URL, the server system 112 can follow the shortened URL to determine the URL that is directly associated with the particular resource. Consequently, the server system 112 generates an annotation data set based on the corresponding post data set, whereby the URL directly associated with the particular resource, as opposed to the shortened URL present in the content data, is provided in the resource identification data 230 of the data set, as discussed in further detail below.

As another example, the server system can also review the context of the content data to determine whether a corresponding annotation data set should be generated. In some cases, the context of the content data can be directed to one or more resources. As an illustration of this, an author may generate a post urging his social networking contacts to "Check out News Network's sports page on their website. This page has the most current college team rankings." When the server system 112 reviews the post data set corresponding to this example post, the server system 112 recognizes that the context of the content data relates to the website for "News Network," and that the content data relates to the sports page of the News Network website in particular. Consequently, the server system 112 can generate one or more annotation data set based on the corresponding post data set. Using the above example, a first annotation data set can be generated, in which the resource identification data 230 is provided as the URL corresponding to the home page of the News Network website. A second annotation data set can be generated, in which the resource identification data 230 is provided as the URL corresponding to the sports page of the News Network website.

In some implementations, the server system 112 can determine whether the user that authored the particular post has opted-in to or opted-out of the use of the post as an annotation to a resource. Further, and in cases where the user has opted-in to the use of the post as an annotation to a resource, the server system 112 can determine whether the user has requested to remain anonymous as the author of the particular post.

The server system 112 can generate an annotation data set based on a post data set in various manners. In some implementations, the server system 112 copies the data from the post data set to corresponding data in the annotation data set. For example, the content data 266 of the post data set is copied to the content data 232 of the annotation data set. The author data 268 of the post data set is copied to the author data 234 of the annotation data set, and the timestamp data 270 of the post data set is copied to the timestamp data 236 of the annotation data set. The rating and/or other data can be similarly copied.

The resource identification data 230 of the annotation data set can include a Resource ID determined by the server system 112 based on the content data 266 of the post content data set. For example, and as discussed above, if the content data explicitly states a Resource ID (e.g., URL), the resource identification data 230 can include the particular Resource ID. If the content data provides a shortened Resource ID, the server system 112 can follow the shortened Resource ID to determine the full Resource ID that is directly associated with the particular resource. The resource identification data 230 can include the full Resource ID. If one or more Resource IDs are derived from the context of the content data 266, as discussed above, the resource identification data 230 of respective annotation data sets can include a Resource ID of the one or more Resource IDs.

In some implementations, a post data set can be generated based on a re-post by one author of a previously submitted post by another author. In such cases, it can first be determined whether the original author of the post has authorized re-posting and further distribution of the post. For example, a first user of a social networking service can author and submit a first post that is presented to other users of the social networking service. Another, second user of the social networking service can author and submit a second post that is a re-post of the first post (e.g., the second post includes the content of the original first post, and identifies the first author). The second post can is submitted and presented to other users of the social networking service. In such an instant, the post data set can include data indicating whether the underlying post is an original post or a re-post of an original post.

Figure 3:
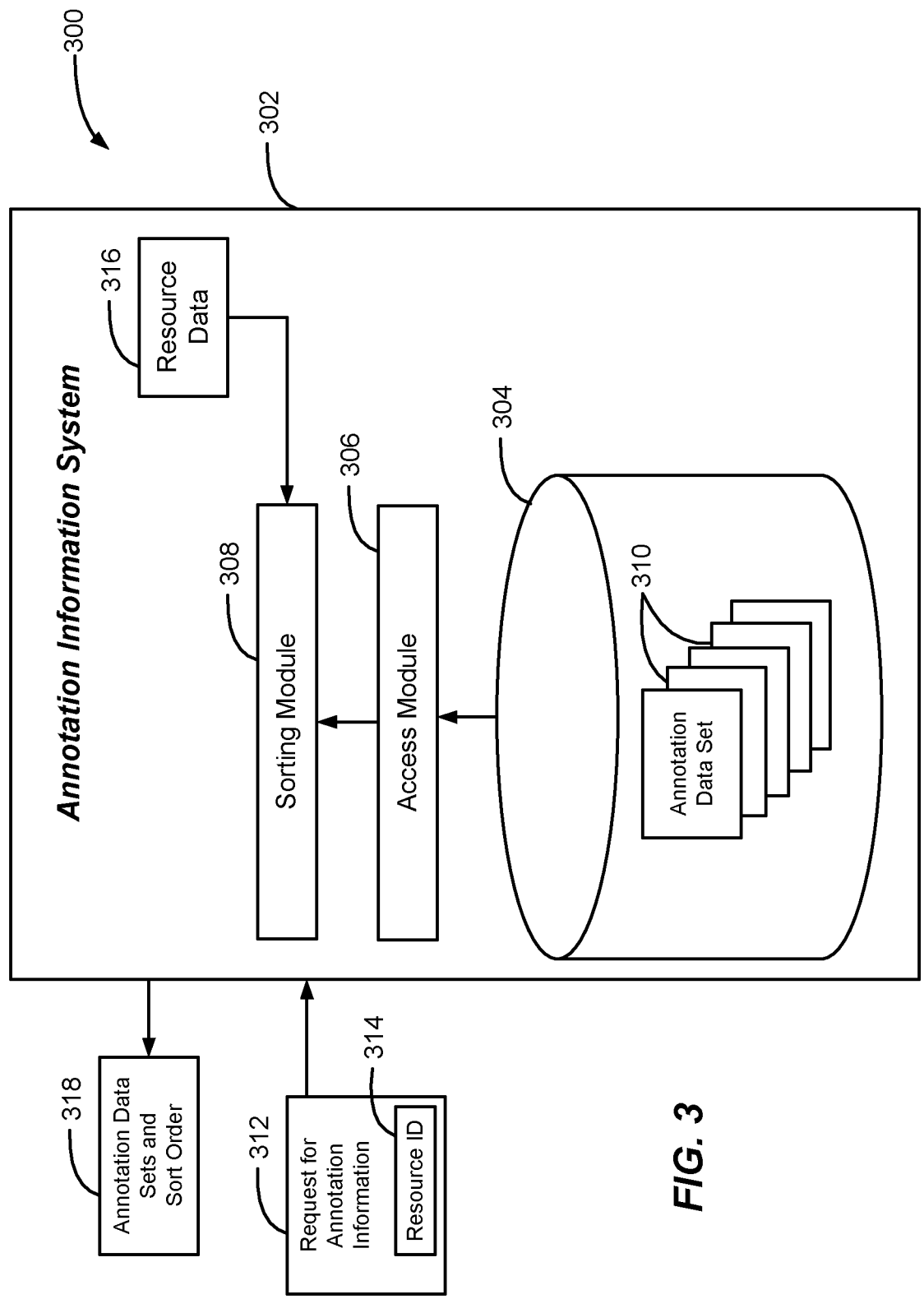
FIG. 3 is a diagram of an example system configured to execute implementations of the present disclosure.

FIG. 3 is a diagram of an example system 300 configured to execute implementations of the present disclosure. The system 300 includes an annotation information system 302 (e.g., the server system 112). The annotation information system 302 includes a database 304, an access module 306 and a sorting module 308. The database 104 stores annotation data sets 310. The access module 306 can receive a request 312 for annotation results corresponding to a particular resource. In some implementations, the request 312 includes a Resource ID 314 corresponding to the particular resource. The request 312 can be generated, for example, in response to a user requesting annotation information at a computing device (e.g., the user 122 of the computing device 102 in FIG. 1). The access module 306 receives the request 312 and retrieves a plurality of annotation data sets 310 from the database 304 as results of the request 312. In some implementations, the access module 306 retrieves all of the annotation data sets having the Resource ID 314 stored as resource identification data. The access module 306 provides the retrieved plurality of annotation data sets 310 as results to the sorting module 308.

The sorting module 308 determines a sort order for the annotation data sets 310. Specifically, the sorting module 308 determines a "buzziness," or popularity of the resource identified in the request 312 based on resource data 316 associated with the resource. The resource data 316 can be stored in computer-readable memory resident at the annotation information system 302, and/or can be retrieved from remotely located computer-readable memory.

In some implementations, the sorting module 308 determines a popularity score for the resource. The popularity score can be determined based on, for example, how often the resource has been requested within a particular period of time, and/or how often the resource is discussed within a particular period of time. In some implementations, the sorting module 308 can retrieve the popularity score, or can compute the popularity score.

In some implementations, the popularity score is determined based on a number of times the resource is requested within a given time period. For example, a number of requests (X1) for a resource can be monitored for a time period (Y1). The time period (Y1) can be measured in seconds, minutes, hours, days, weeks, months and/or years. The popularity score can be calculated as the quotient of the number of requests (X1) and the time period (Y1) (i.e., popularity score=X1/Y1). For example, a first resource is requested 10000 times over a 1-day period, and a second resource is requested 15000 times over a 2-day period. The popularity score for the first resource is calculated as 10000 requests per day. The popularity score for the second resource is calculated as 7500 requests per day. Consequently, the first resource can be deemed to be more popular than the second resource.

In some implementations, the popularity score is determined based on how often the resource is discussed within a particular time period. For example, a metric can be maintained that indicates the number of times a particular resource is discussed in Internet communications. The Internet communications can include annotations, content posted in other resources (e.g., news stories and/or web pages discussing the resource), social networking posts, and/or blog posts. For example, a number of times (X2) a resource is discussed can be monitored for a time period (Y2). The time period (Y2) can be measured in seconds, minutes, hours, days, weeks, months and/or years. The popularity score can be calculated as the quotient of the number of requests (X2) and the time period (Y2) (i.e., popularity score=X2/Y2). For example, a first resource is discussed 10000 times over a 1-day period, and a second resource is discussed 15000 times over a 2-day period. The popularity score for the first resource is calculated as 10000 discussions per day. The popularity score for the second resource is calculated as 7500 discussions per day. Consequently, the first resource can be deemed to be more popular than the second resource.

In some implementations, the popularity score can be a combination of popularity scores. For example, a first popularity score can be calculated based on a number of requests (X1) for a resource over a time period (Y1), as discussed above. A second popularity score can be calculated based on a number of times (X2) a resource is discussed over a time period (Y2). The first popularity score and the second popularity score can be combined to provide an overall popularity score for a particular resource.

In some implementations, the first and second popularity scores can be summed. In some implementations, a first weighting factor is applied to the first popularity score to provide a first weighted popularity score, and a second weighting factor is applied to the second popularity score to provide a second weighted popularity score. The first and second weighted popularity scores can be summed to provide an overall popularity score for the particular resource. In this manner, the first and second popularity scores are weighted to better reflect the real value of the popularity score. For example, the number of times a resource is requested over a particular time period may be more relevant to the popularity of the resource than the number of times it is discussed over the same time period.

It should be noted that the popularity score for a resource can vary over time. For example, a resource may be popular one day and can be less popular the next day, or over several subsequent days. Consequently, the popularity score for a resource can be periodically determined (e.g., every minute, hourly, daily, weekly, monthly). In some implementations, the popularity score can be determined "on-the-fly." Specifically, the popularity score can be determined upon a request for annotations to the resource to be displayed.

However determined, the popularity score for a resource can be compared to a threshold popularity score to determine whether the resource is currently popular (i.e., "buzzy"). If the popularity score falls below the threshold popularity score, the resource is deemed to not be popular. If the popularity score is at or above the threshold popularity score, the resource is deemed to be popular.

Referring again to FIG. 3, the sorting module 308 determines the sort order of the annotations based on the popularity score and provides data 318 including the annotations and the sort order to a computing device associated with the requesting user. For example, if the popularity score is less than the threshold popularity score, the sort order is provided on a first basis, and, if the popularity score is equal to or greater than the threshold popularity score, the sort order is provided on a second basis.

In some implementations, the first basis includes the ratings associated with the annotations to be displayed. For example, the sort order of the annotations includes the highest rated annotation first and the lowest rated annotation last. In this manner, if the resource is deemed to not be popular, or "buzzy," the highest rated, or best quality annotations are provided first (e.g., at the top of a web page or frame within a web page) and the lowest rated, or least quality annotations are provided last (e.g., at the bottom of a web page or frame within a web page). In some implementations, the second basis includes the timestamps associated with the annotations to be displayed. For example, the sort order of the annotations includes the most recently posted annotation first (e.g., at the top of a web page or frame within a web page) and the earliest posted annotation last (e.g., at the top of a web page or frame within a web page). In this manner, if the resource is deemed to be popular, or "buzzy," the most recent annotations are provided first and the earliest annotations are provided last.

In some implementations, the user can override the sort order to have the annotations provided in a user selected sort order. For example, the user can select a desired sort order from a plurality of selectable sort orders displayed at the computing device. The annotations can be reordered based on the desired sort order. In some implementations, the annotations can be reordered at the computing device based on the user selected sort order.

Figure 4A:
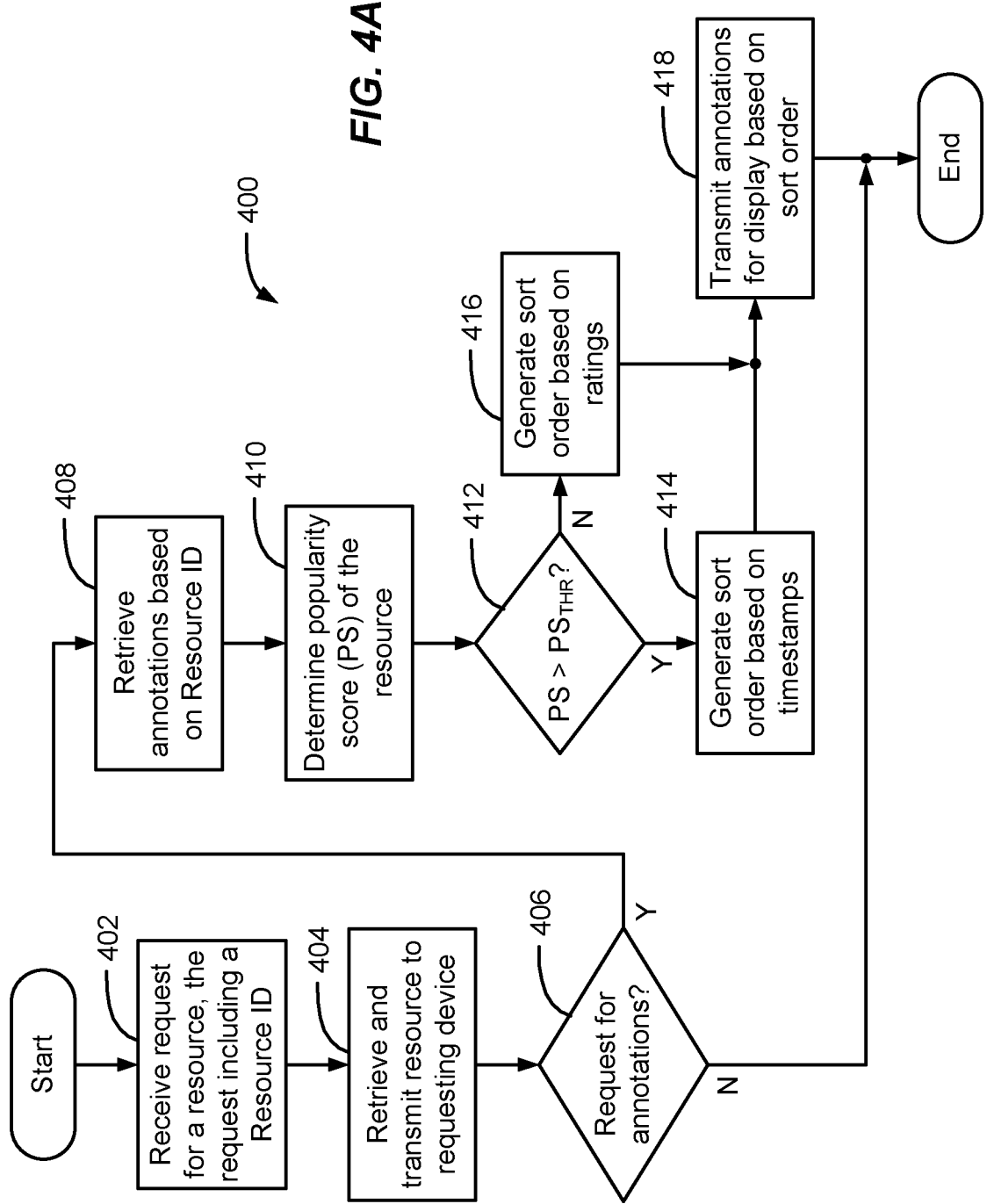
FIG. 4A is a flowchart illustrating an example server-side process that can be executed in implementations of the present disclosure.

FIG. 4A is a flowchart illustrating an example server-side process 400 that can be executed in implementations of the present disclosure. For example, the process 400 can be executed by the server system 112 (FIG. 1), the server system 114 (FIG. 1) of the annotation information system 302 (FIG. 3).

A request for a resource is received (402), the request including a Resource ID (e.g., URI) associated with the resource. For example, the server system 112, 114 can receive a request issued from a computing device 102 (FIG. 1). The requested resource is retrieved and is transmitted to the requesting computing device (404). For example, the server system 112, 114 retrieves the resource from computer-readable memory (e.g., database 118) and transmits the resource to the requesting computing device 102.

It is determined whether a request for annotations is received (406). For example, the server system 112, 114 determines whether a request for annotations is received from the requesting computing device 102. If a request for annotations is not received, the process 400 ends. If a request for annotations is received, annotation data sets are retrieved based on the Resource ID of the transmitted resource (408). For example, the server system 112, 114 can retrieve annotations data sets (e.g., data sets 220-226 (FIG. 2A)) from the database 118. A popularity score (PS) associated with the resource is determined (410). For example, the server system 112, 114 can determine the popularity score as discussed in detail above.

It is determined whether the popularity score (PS) of the resource is greater than a threshold popularity score ($PS_{THR}$) (412). For example, the server system 112, 114 can determined whether the popularity score (PS) of the resource is greater than a threshold popularity score ($PS_{THR}$). If the popularity score is greater than the threshold popularity, the resource is deemed to be popular and a sort order is generated based on the respective timestamps of the annotation data sets (414). For example, the server system 112, 114 generates the sort order based on the respective timestamps of the annotation data sets. If the popularity score is not greater than the threshold popularity, the resource is deemed to not be popular and a sort order is generated based on the respective ratings, or quality of the annotation data sets (416). For example, the server system 112, 114 generates the sort order based on the respective ratings, or quality of the annotation data sets. The annotation data sets and the sort order are transmitted (418). For example, the server system 112, 114 transmits the annotation data sets and the sort order to the requesting computing device 102.

In some implementations, the requesting computing device (e.g., the computing device 102) can determine whether the resource is popular in lieu of or in addition to this determination being made on the server-side. For example, the requesting computing device can receive the annotation data sets, can determine whether the resource is popular (i.e., whether the popularity score (PS) of the resource is greater than the threshold popularity score ($PS_{THR}$)), can determine the sort order based on determining whether the resource is popular, and can display the annotations based on the sort order.

Figure 4B:
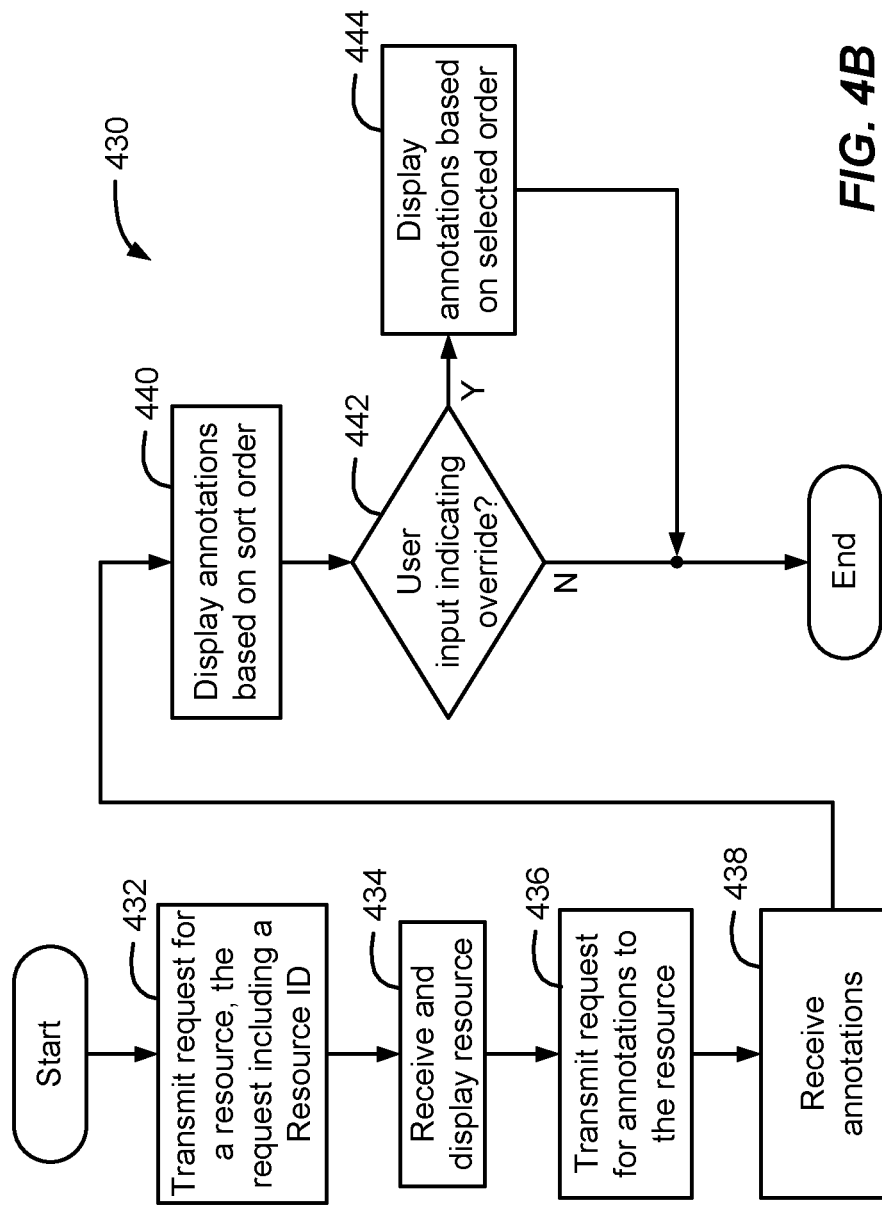
FIG. 4B is a flowchart illustrating an example client-side process that can be executed in implementations of the present disclosure.

FIG. 4B is a flowchart illustrating an example client-side process 430 that can be executed in implementations of the present disclosure. For example, the process 430 can be executed by any of the computing devices 102-110 (FIG. 1).

A request for a resource is transmitted (432), the request including a Resource ID (e.g., URI) corresponding to the resource. For example, the computing device 102 can transmit a request for a web page to a server (e.g., server system 112, 114 (FIG. 1)), the request including the URL associated with the web page. The requested resource is received and displayed (434). For example, in response to the request, the server system 112, 114 transmits the requested resource to the computing device 102, which renders the resource (e.g., web page) for display to a user (e.g., user 122).

A request for annotations to the resource is transmitted (436). For example, the computing device 102 can receive input from the user 122 indicating the user's desire to see annotations related to the displayed resource. The computing device 102 transmits the request to the server system 112, 114. The annotation data sets relating to the displayed resource are received (438) and representations of the annotation data sets are displayed based on a sort order (440). For example, the computing device displays annotations that are each visual representations of their respective, underlying annotation data sets. The sort order can be determined by the server system 112, 114, as discussed above, or can be determined by the receiving computing device 102, as discussed above. It is determined whether a user input is received indicating a user override of the sort order (442). If a user input indicating a user override of the sort order is not received, the process 430 ends. If a user input indicating a user override of the sort order is received, the annotations are displayed based on a user selected sort order (444), and the process 430 ends.

Figure 5A:
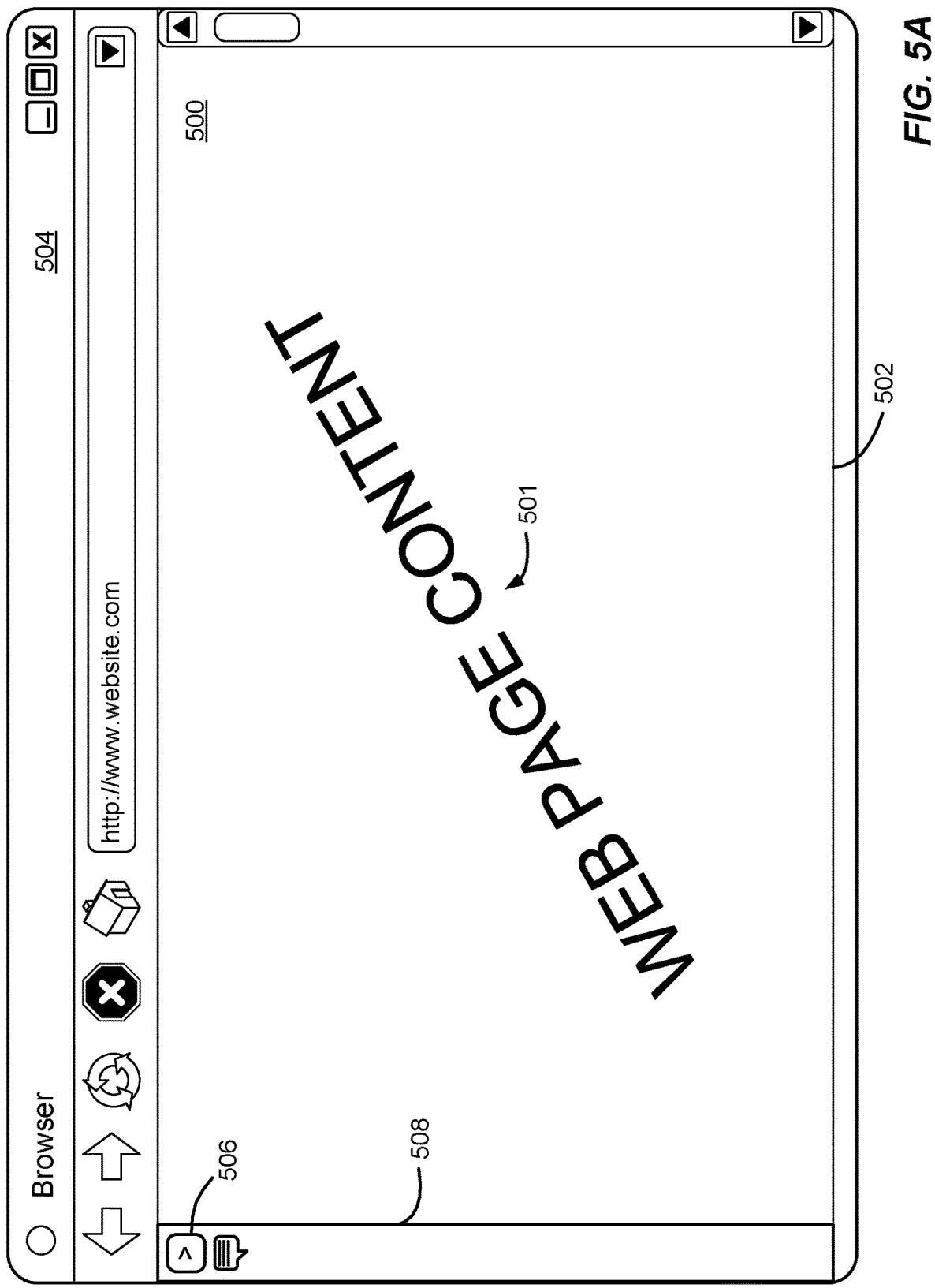
FIG. 5A depicts a screen-shot of an example web page.

FIG. 5A depicts a screen-shot of an example web page 500. The example web page 500 includes web page content 501 and is displayed within a frame 502 of a browser 504. An annotation display button 506 is provided in a vertical toolbar 508. A user viewing the web page 500 can click on the annotation display button 506, and/or can provide other input indicating that the user would like to see annotations relating to the web page.

Figure 5B:
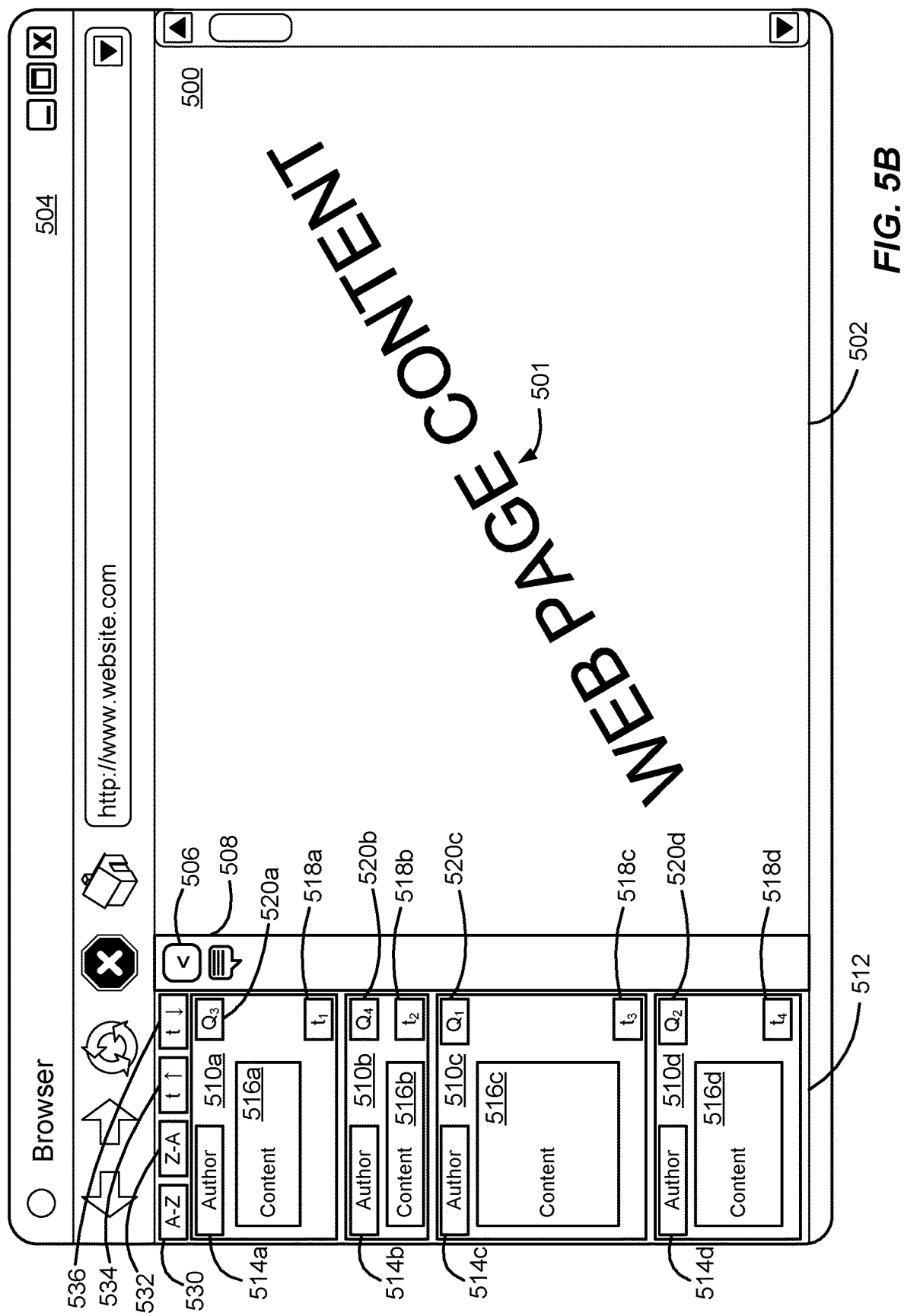
FIG. 5B depicts a screen-shot of the example web page including annotations sorted based on a first sort order.

FIG. 5B depicts a screen-shot of the example web page 500 including annotations 510a-510d sorted based on a first sort order. More specifically, when a user viewing the web page 500 clicks on the annotation display button 506, and/or provides another input indicating that the user would like to see annotations relating to the web page, a second frame 512 is provided, within which the annotations 510a-510d are displayed. In the example of FIG. 5B, the annotations 510a-510 each include an author 514a-514d, respectively, content 516a-516d, respectively, a posting date 518a-518d, respectively, and a quality score 520a-520d, respectively.

In the example illustration of FIG. 5B, the web page is deemed to be popular, or "buzzy." In other words, a popularity score associated with the web page 500 is greater than a threshold popularity score. Consequently, the annotations 510a-510d are arranged in a time-based sort order that includes the most recent annotation (i.e., annotation 510a with posting time/date (ti) 518a) displayed first (i.e., at the top of the frame 512). Although the example illustration FIG. 5B includes the posting time/date displayed with each annotation, in some implementations, the posting time/date is not displayed with each annotation.

Figure 5C:
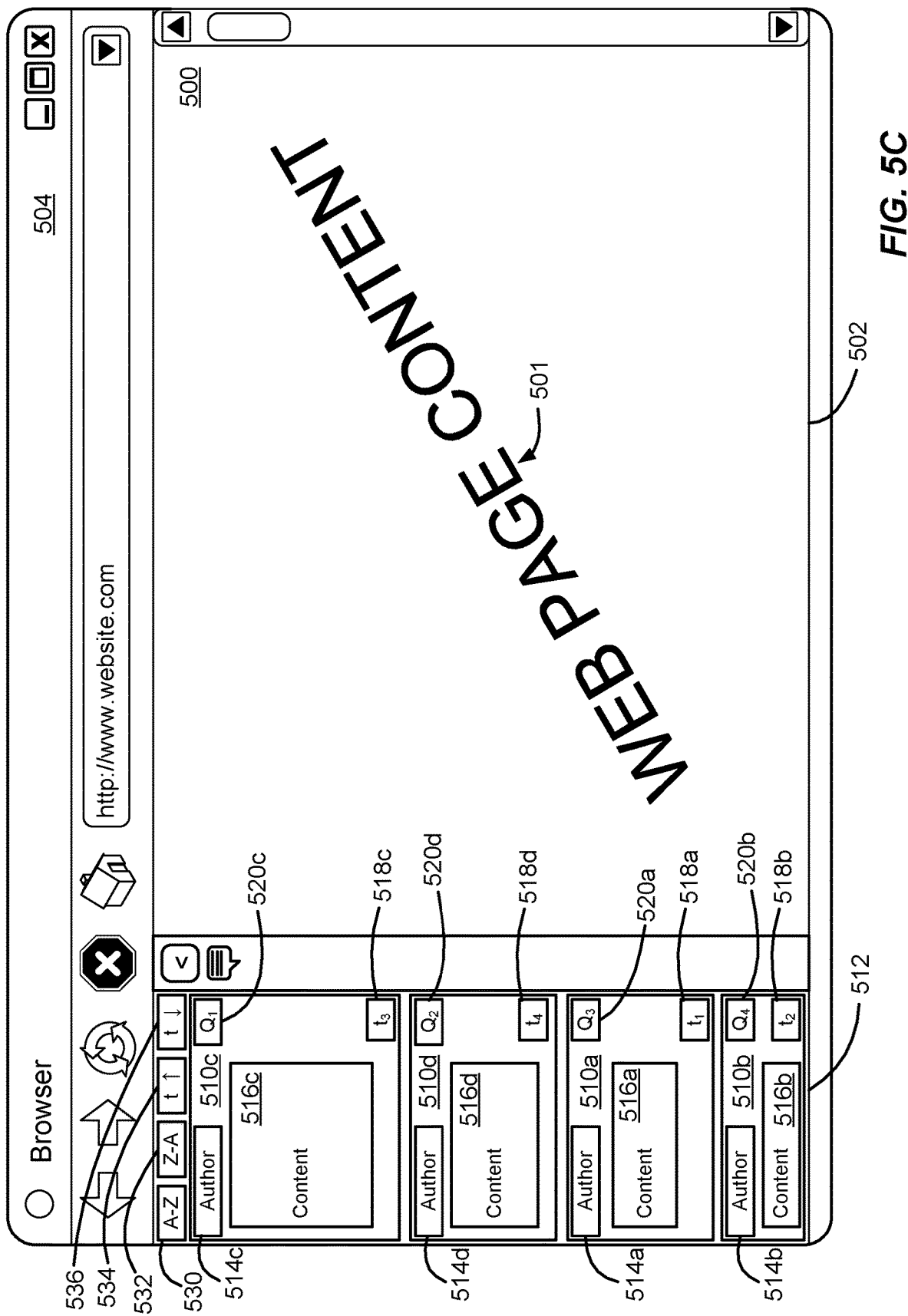
FIG. 5C depicts a screen-shot of the example web page including annotations sorted based on second sort order.

FIG. 5C depicts a screen-shot of the example web page 500 including annotations 510a-510d sorted based on second sort order. In the example illustration of FIG. 5C, the web page is not deemed to be popular, or "buzzy." In other words, a popularity score associated with the web page 500 is not greater than a threshold popularity score. Consequently, the annotations 510a-510d are arranged in a quality-based sort order that includes the highest quality annotation (i.e., annotation 510c with quality/rating ($Q_1$) 518c) displayed first (i.e., at the top of the frame 512). Although the example illustration FIG. 5C includes the quality/rating displayed with each annotation, in some implementations, the quality/rating is not displayed with each annotation.

With continued reference to FIGS. 5B and 5C, in some implementations, sort order buttons can be displayed in the frame 512. Example sort order buttons include an alphabetical sort order from A-Z button 530, an alphabetical sort order from Z-A button 532, a date/time from most recent button 534 and a date/time from earliest button 536. The user can provide user input by clicking on one of the sort order buttons 530-536. In response to receiving the user input, the browser 504 orders the annotations 510a-d based on the user selected order. For example, if the user clicks on the alphabetical sort order from A-Z button 530, the annotations 510a-d may be ordered and displayed based on the alphabetical order of the respective author names, for example. In this manner, although the annotations 510a-d may be initially displayed in response to the popularity, or "buzziness" of the web page 500, the user can override the original sort order by indicating a desired or target sort order using the sort order buttons 530-536.

Although the example implementation discussed herein relates to displaying and sorting annotations to a web page, implementations of the present disclosure can be realized for displaying and sorting any type of results corresponding to any type of resource. Accordingly, implementations of the present disclosure are not limited to the example illustrations provided herein.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the following claims. For example, the actions recited in the claims can be performed in a different order and still achieve desirable results.

What is claimed is:

1. A computer-implemented method comprising:
   receiving a request for a particular item of online content from a particular client device;
   in response to receiving the request for the particular item of online content, determining, based at least on comparing an overall popularity score to a threshold popularity score, whether the particular item of online content is classified as currently popular, the overall popularity score being determined by aggregating first and second popularity scores that indicate how often the particular item of online content has been mentioned in Internet communications over first and second time periods, respectively;
   selecting, (i) based on an indication of whether the particular item of online content is classified as currently popular and (ii) from among two or more ordering techniques that are used to order user submitted comments, a particular one of the ordering techniques with which to order the user submitted comments that will be presented with the particular item of online content, comprising:
      when the particular item of online content is classified as currently popular, determining respective timestamps that indicate when the user submitted comments were submitted, then selecting a time-based ordering technique that ranks the user submitted comments that will be presented with the particular item of online content according to respective timestamps that indicate when the user submitted comments were submitted, and
      when the particular item of online content is classified as not currently popular, determining a quality score for each of the user submitted comments that will be presented with the particular item of online content based at least on two or more of (i) a rating associated with the user submitted comments, (ii) a respective length of the user submitted comments, (iii) a respective language of the user submitted comments, and (iv) a social graph of an author of the user submitted comments, then selecting a quality-based ordering technique that ranks user submitted comments according to a respective quality score associated with the user submitted comments; and
   providing, in response to the request, at least some of the user submitted comments for presentation with the particular item of online content, ranked according to the selected ordering technique.

2. The method of claim 1, wherein providing at least some of the user submitted comments comprises transmitting instructions that cause a client device to present the at least some of the user submitted comments in a first frame of a graphical user interface that differs from a second frame of the graphic user interface in which the particular item of online content is presented.

3. The method of claim 1, wherein one or more of the user submitted comments includes posts submitted through one or more social networks.

4. The method of claim 1, comprising:
   receiving a plurality of post data sets, each post data set corresponding to one or more social networks;
   determining that a sub-set of the plurality of post data sets correspond to the particular item of online content; and
   generating, for each post data set of the sub-set, an annotation data set.

5. The method of claim 1, wherein user submitted comments for items of online content that are classified as currently popular are sorted differently than user submitted comments for items of online content that are classified as not currently popular.

6. The method of claim 1, wherein user submitted comments for items of online content that are classified as currently popular are sorted without regard to quality of the content of the user submitted comments.

7. A system comprising:
   one or more processors; and
   a computer-readable medium coupled to the one or more processors and having instructions stored thereon which, when executed by the one or more processors, cause the one or more processors to perform operations comprising:
   receiving a request for a particular item of online content from a particular client device;
   in response to receiving the request for the particular item of online content, determining, based at least on comparing an overall popularity score to a threshold popularity score, whether the particular item of online content is classified as currently popular, the overall popularity score being determined by aggregating first and second popularity scores that indicate how often the particular item of online content has been mentioned in Internet communications over first and second time periods, respectively;
   selecting, (i) based on an indication of whether the particular item of online content is classified as currently popular and (ii) from among two or more ordering techniques that are used to order user submitted comments, a particular one of the ordering techniques with which to order the user submitted comments that will be presented with the particular item of online content, comprising:
      when the particular item of online content is classified as currently popular, determining respective timestamps that indicate when the user submitted comments were submitted, then selecting a time-based ordering technique that ranks the user submitted comments that will be presented with the particular item of online content according to respective timestamps that indicate when the user submitted comments were submitted, and when the particular item of online content is classified as not currently popular, determining a quality score for each of the user submitted comments that will be presented with the particular item of online content based at least on two or more of (i) a rating associated with the user submitted comments, (ii) a respective length of the user submitted comments, (iii) a respective language of the user submitted comments, and (iv) a social graph of an author of the user submitted comments, then selecting a quality-based ordering technique that ranks user submitted comments according to a respective quality score associated with the user submitted comments; and providing, in response to the request, at least some of the user submitted comments for presentation with the particular item of online content, ranked according to the selected ordering technique.

8. The system of claim 7, wherein providing at least some of the user submitted comments comprises transmitting instructions that cause a client device to present the at least some of the user submitted comments in a first frame of a graphical user interface that differs from a second frame of the graphic user interface in which the particular item of online content is presented.

9. The system of claim 7, wherein one or more of the user submitted comments includes posts submitted through one or more social networks.

10. The system of claim 7, wherein the operations comprise:
receiving a plurality of post data sets, each post data set corresponding to one or more social networks;
determining that a sub-set of the plurality of post data sets correspond to the particular item of online content; and
generating, for each post data set of the sub-set, an annotation data set.

11. The system of claim 7, wherein user submitted comments for items of online content that are classified as currently popular are sorted differently than user submitted comments for items of online content that are classified as not currently popular.

12. The system of claim 7, wherein user submitted comments for items of online content that are classified as currently popular are sorted without regard to quality of the content of the user submitted comments.

13. A non-transitory computer-readable medium storing instructions that, when executed by one or more processors, cause the one or more processors to perform operations comprising:
receiving a request for a particular item of online content from a particular client device;
in response to receiving the request for the particular item of online content, determining, based at least on comparing an overall popularity score to a threshold popularity score, whether the particular item of online content is classified as currently popular, the overall popularity score being determined by aggregating first and second popularity scores that indicate how often the particular item of online content has been mentioned in Internet communications over first and second time periods, respectively;
selecting, (i) based on an indication of whether the particular item of online content is classified as currently popular and (ii) from among two or more ordering techniques that are used to order user submitted comments, a particular one of the ordering techniques with which to order the user submitted comments that will be presented with the particular item of online content, comprising:
when the particular item of online content is classified as currently popular, determining respective timestamps that indicate when the user submitted comments were submitted, then selecting a time-based ordering technique that ranks the user submitted comments that will be presented with the particular item of online content according to respective timestamps that indicate when the user submitted comments were submitted, and
when the particular item of online content is classified as not currently popular, determining a quality score for each of the user submitted comments that will be presented with the particular item of online content based at least on two or more of (i) a rating associated with the user submitted comments, (ii) a respective length of the user submitted comments, (iii) a respective language of the user submitted comments, and (iv) a social graph of an author of the user submitted comments, then selecting a quality-based ordering technique that ranks user submitted comments according to a respective quality score associated with the user submitted comments; and
providing, in response to the request, at least some of the user submitted comments for presentation with the particular item of online content, ranked according to the selected ordering technique.

14. The medium of claim 13, wherein providing at least some of the user submitted comments comprises transmitting instructions that cause a client device to present the at least some of the user submitted comments in a first frame of a graphical user interface that differs from a second frame of the graphic user interface in which the particular item of online content is presented.

15. The medium of claim 13, wherein one or more of the user submitted comments includes posts submitted through one or more social networks.

16. The medium of claim 13, wherein the operations comprise:
receiving a plurality of post data sets, each post data set corresponding to one or more social networks;
determining that a sub-set of the plurality of post data sets correspond to the particular item of online content; and
generating, for each post data set of the sub-set, an annotation data set.

17. The medium of claim 13, wherein user submitted comments for items of online content that are classified as currently popular are sorted differently than user submitted comments for items of online content that are classified as not currently popular.

* * * * *